United States Patent [19]

Davis

[11] Patent Number: 4,934,638
[45] Date of Patent: Jun. 19, 1990

[54] COLLAPSIBLE TRIPOD STOOL

[76] Inventor: Kevin R. Davis, 456 S. Spalding, Beverly Hills, Calif. 90212

[21] Appl. No.: 341,739

[22] Filed: Apr. 21, 1989

Related U.S. Application Data

[63] Continuation-in-part of Ser. No. 154,631, Feb. 10, 1988, abandoned.

[51] Int. Cl.⁵ ............................................. F16M 11/32
[52] U.S. Cl. .................................... 248/164; 108/118; 248/163.1; 248/166; 248/188.5; 248/188.6
[58] Field of Search ............. 248/164, 431, 432, 166, 248/170, 173, 187, 188.5, 188.6, 163.1, 163.2, 125, 354.1, 159; 108/118

[56] References Cited

U.S. PATENT DOCUMENTS

| | | | |
|---|---|---|---|
| 32,698 | 7/1861 | Johnson | 248/164 X |
| 64,694 | 5/1867 | Olds | 108/118 |
| 115,598 | 6/1871 | Free | 248/164 X |
| 587,391 | 8/1897 | Gandy | 297/18 |
| 615,476 | 12/1898 | Chapman | 108/118 |
| 747,204 | 12/1903 | Mock | 108/118 |
| 772,316 | 10/1904 | Mock | 248/164 X |
| 1,172,439 | 2/1916 | Crozier | 248/164 X |
| 2,696,963 | 12/1954 | Shepherd | 248/125 X |
| 2,710,733 | 6/1955 | Phillips | 248/431 |
| 2,722,973 | 11/1955 | Murcott | 108/118 |
| 2,873,129 | 2/1959 | Edmunson | 248/188.5 X |
| 3,638,588 | 2/1972 | Abbot | 108/128 |
| 3,704,850 | 12/1972 | Hendrickson et al. | 248/188.5 |
| 3,709,167 | 1/1973 | Sprigman | 108/128 |
| 3,712,652 | 1/1973 | Uilkema | 248/188.5 X |
| 3,947,140 | 3/1976 | Thomas | 248/188.5 X |
| 3,987,807 | 10/1976 | Varnell | 248/188.5 X |
| 4,019,765 | 4/1977 | Nichola | 248/354 X |
| 4,174,900 | 11/1979 | Ina | 248/188.5 X |
| 4,679,655 | 7/1987 | Behring | 108/118 X |
| 4,717,108 | 1/1988 | Liedle | 248/164 X |

FOREIGN PATENT DOCUMENTS

| | | | |
|---|---|---|---|
| 2102225 | 12/1972 | Fed. Rep. of Germany | 248/125 |
| 2163857 | 6/1973 | Fed. Rep. of Germany | 248/431 |

*Primary Examiner*—Ramon O. Ramirez
*Attorney, Agent, or Firm*—Blakely, Sokoloff, Taylor & Zafman

[57] ABSTRACT

A collapsible tripod stool for bodily and tangible item support is described. The triangularly shaped seat is supported by a plurality of tubular legs, which may be fused, glued, or otherwise connected to the corners of the seat. In one embodiment, telescoping legs are comprised of upper, central, and lower sections, the central leg section having two different diameters to prevent section contact, and being cast as one piece to eliminate welded surfaces. The central leg sections are attached to a triangularly-shaped central pivot joint by threaded members to prevent mobilization of the legs with respect to one another. The telescoping legs are angled to maximize ground surface contact and further stabilize the tripod stool of the present invention. In another embodiment, tubular legs are comprised of upper and lower sections which connect to one another and are coupled together by an elastic cord within each leg. The leg sections are conveniently detached at their approximate midpoints and folded together in a compact bundle. A pivot joint comprises fabric straps secured to each leg and centrally joined to one another.

14 Claims, 5 Drawing Sheets

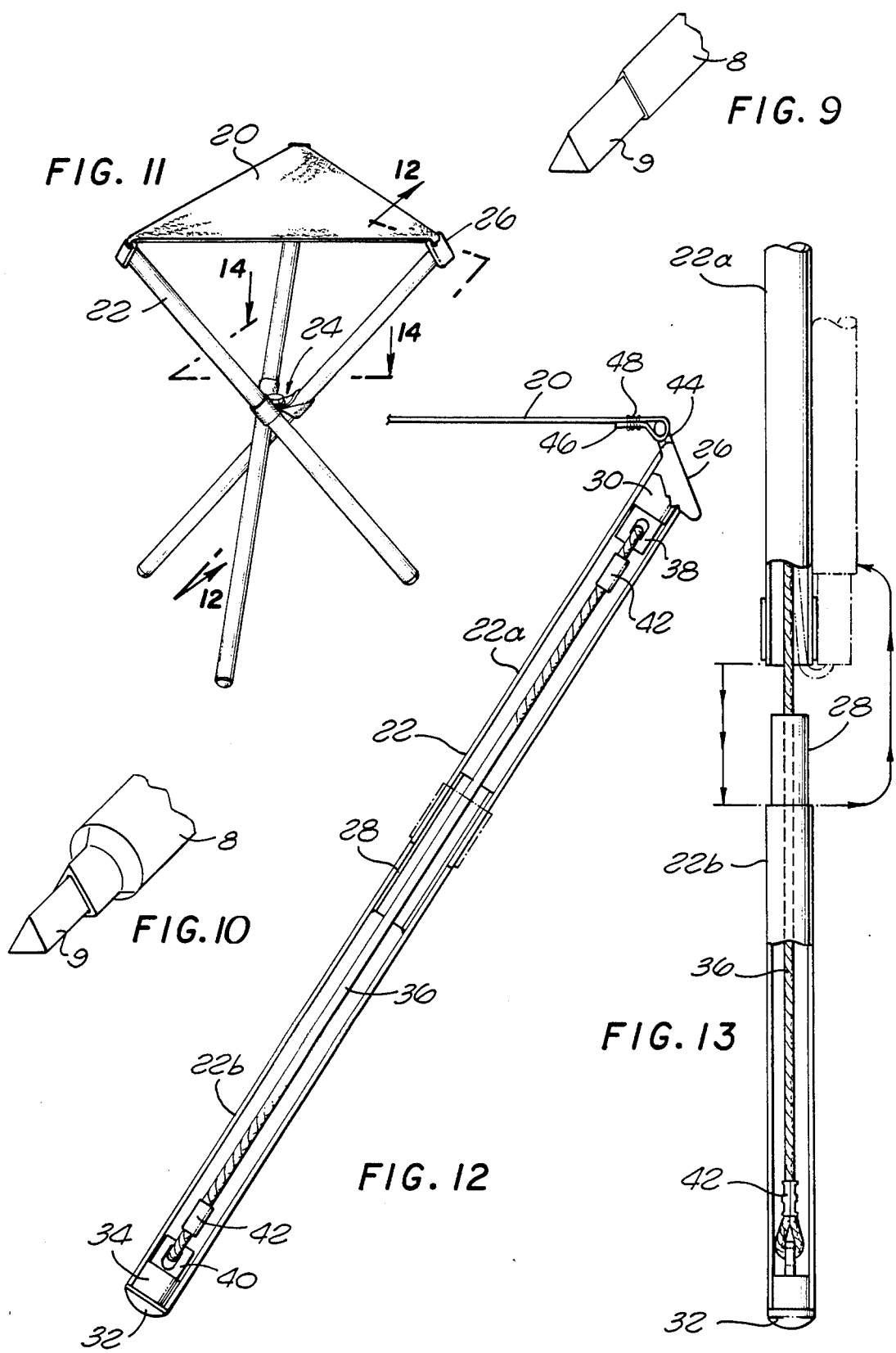

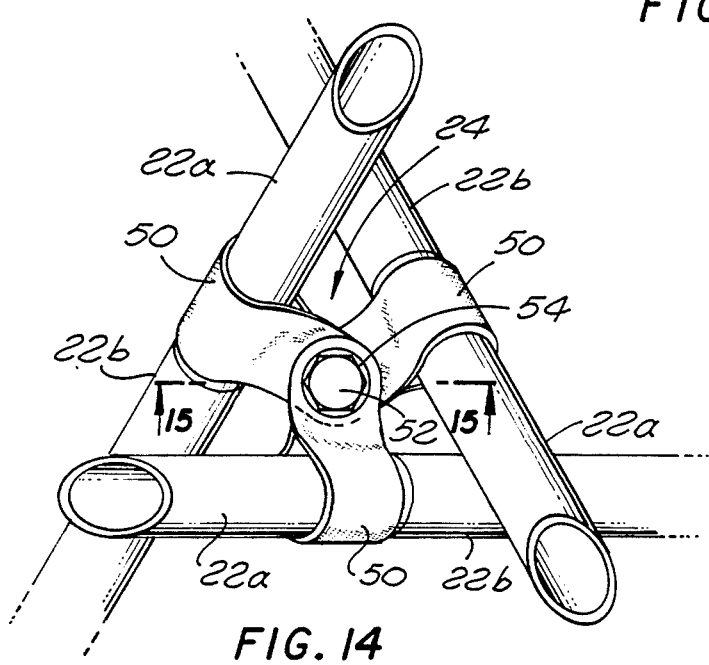
FIG. 14
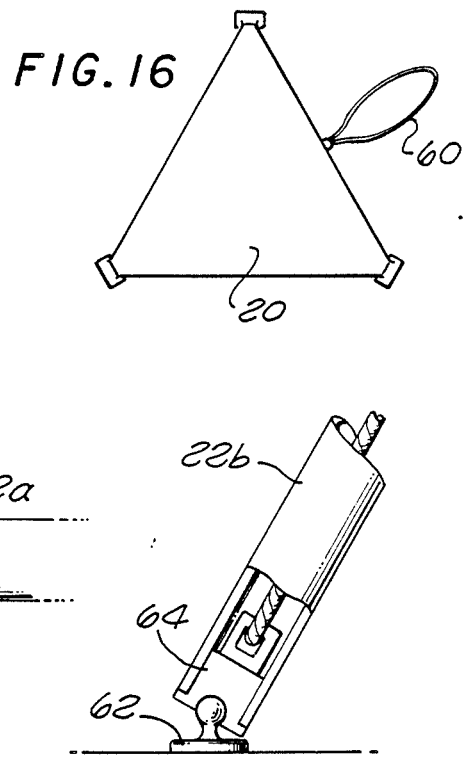
FIG. 16
FIG. 18
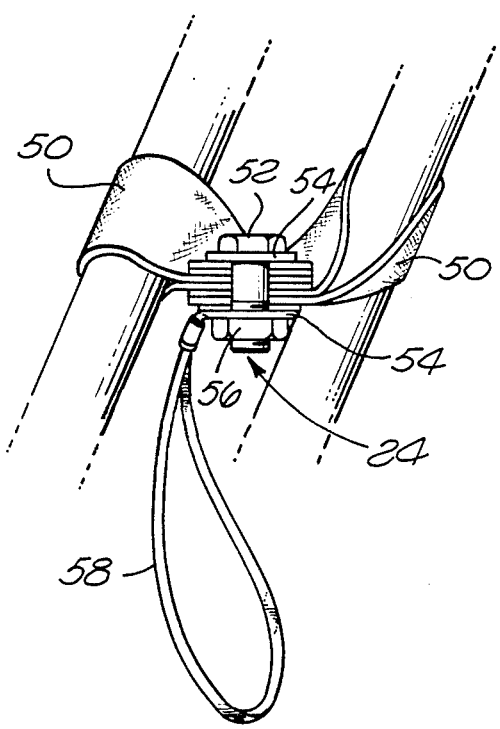
FIG. 15
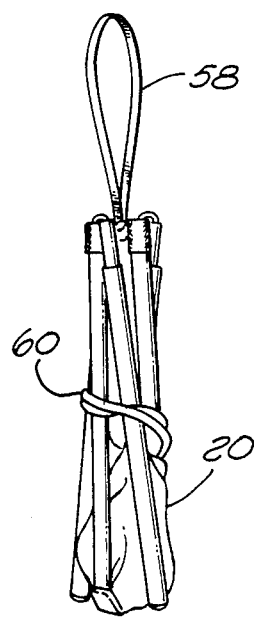
FIG. 17

COLLAPSIBLE TRIPOD STOOL

This is a continuation in part of application Ser. No. 07/154,631 filed Feb. 10, 1988, now abandoned.

BACKGROUND OF THE INVENTION

1. FIELD OF THE INVENTION

This invention relates to the field of portable seats and support members.

2. BACKGROUND ART

It has often been desired to provide a portable seat or support member which may be conveniently transported from place to place and used on a variety of terrains and conditions. It is also desired to provide a portable seat which may be reduced to a small size for ease of carrying and storage. In the prior art, tripod stools have been utilized to provide portable seating. Among the primary disadvantages of prior art tripod stools is instability, which results from slipping of the support members against the ground, and unstable movement of the legs with respect to one another. Another disadvantage of the typical support apparatus is the danger of corrosion or fatigue of welded surfaces, thereby increasing the potential for unintended collapse of the support members. Still another problem is undesirable mobilization of the seat or support surface with respect to the other members.

Therefore, it is an object of the present invention to provide a tripod stool in which movement of the legs with respect to one another is minimized.

It is another object of the present invention to provide a tripod stool in which movement of the legs with respect to the ground is reduced.

It is yet another object of the present invention to provide a tripod stool with a stable seat or support surface with respect to the other members.

It is still another object of the present invention to provide telescoping stool legs in which welded surfaces are minimized.

It is still another object of the present invention to provide a tripod stool with telescoping legs which are easily and quickly adjustable.

It is still another object of the present invention to provide a tripod stool which is easily manufactured and aesthetically pleasing.

SUMMARY OF THE INVENTION

A collapsible tripod support stool is described. A triangularly shaped seat is supported by a plurality of tubular legs, which may be fused, glued, or otherwise connected to the corners of the seat.

In one embodiment, telescoping leg assemblies are comprised of upper, central, and lower sections, the central leg section having a dual diameter configuration. The upper and lower leg sections are of two diameters so as to nest within one another when collapsed and result in a more compact storage configuration of the stool of the present invention. The central leg section is formed as a single piece to eliminate welded surfaces. The leg assemblies are attached to a triangularly-shaped central pivot joint by threaded members to provide stability of the legs and to prevent mobilization of the legs with respect to one another. The feet of the leg assemblies are angled to maximize ground surface contact and to further stabilize the tripod stool of the present invention.

In another embodiment, tubular leg assemblies are comprised of upper and lower sections which connect to one another and are coupled together by an elastic cord within each leg. The leg sections are conveniently detached at their approximate midpoints and folded together in a compact bundle. A pivot joint comprises fabric straps secured to each leg and centrally joined to one another.

BRIEF DESCRIPTION OF THE DRAWINGS

FIG. 9 is an alternate embodiment of the present invention.

FIG. 10 is a further embodiment of the present invention.

FIG. 11 is yet a further embodiment of the present invention.

FIG. 12 is a cross sectional view of one of the leg assemblies of the stool of FIG. 11.

FIG. 13 illustrates detachment and folding of one of the leg assemblies.

FIG. 14 is a detailed view of the central pivot joint taken across line 14—14 in FIG. 11.

FIG. 15 is a cross sectional view of the central pivot joint taken across line 15—15 in FIG. 14.

FIG. 16 illustrates attachment of an elastic securing strap to the stool of FIG. 11.

FIG. 17 illustrates the stool of FIG. 11 in its fully collapsed configuration.

FIG. 18 is a detailed view of an alternative foot for the leg assemblies of the present invention.

DETAILED DESCRIPTION OF THE PRESENT INVENTION

A collapsible tripod stool is described. In the following description, numerous specific details, such as materials and shapes, are described in order to provide a more thorough understanding of the present invention. It will be obvious to one skilled in the art that the present invention may be practiced without these specific details. In other instances, well known features have not been described in detail in order not to unnecessarily obscure the present invention.

In one embodiment, the present invention comprises a tripod stool in which a nylon seat is coupled to three telescoping leg assemblies. Each leg assembly comprises a central section with a first end having a small diameter and a second end having a large diameter. A bottom leg section having a small diameter is telescopically mounted to the central section. A top leg section having a large diameter is also telescopically mounted to the central leg section. In the collapsed (storage) state, the bottom leg section is nested within the top leg section and both are within the central leg section, providing approximately a 3 to 1 reduction advantage. The top and bottom leg sections are "keyed" to the central leg section by means of a slot and ridge configuration.

The three leg assemblies are coupled together at a central pivot joint which prevents motion of the telescoping legs with respect to one another. Each of the central leg sections includes a threaded extending member which is mated to a tapped hole in the central pivot. When extended, the top and bottom leg sections are held in place with built in spring clips. One or both of the top and bottom sections may include a plurality of openings for selectably adjusting the length of the leg assemblies. The keyed construction ensures that the built in spring clips are registered with the openings. The bottom leg section includes a "foot" which is angled to maximize ground surface contact and minimize slippage of the legs against the ground.

Figure 1:
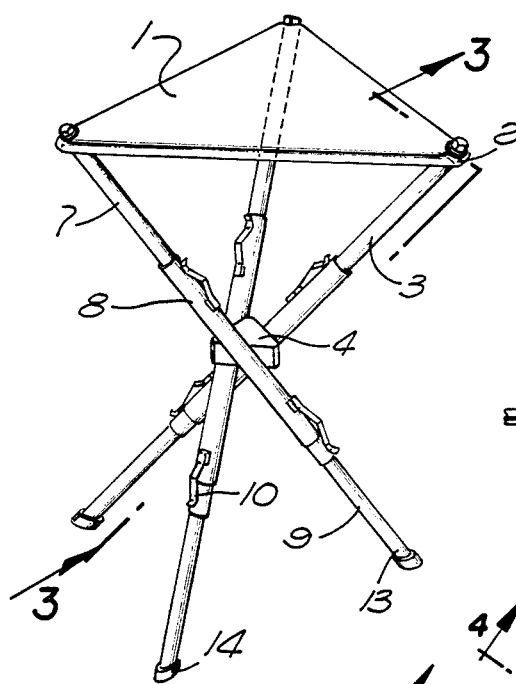
FIG. 1 is a perspective of the telescoping tripod stool.

A first embodiment of the present invention is illustrated in FIG. 1. In accordance with the invention, the stool is comprised of a triangular seat 1, a central pivot joint 4, and a plurality of telescoping legs 3.

The seat 1 may be constructed in any shape or size. In the present invention the seat 1 has a triangular configuration and is stabilized by virtue of telescoping legs joined to the seat corners 2. The seat may be constructed of nylon, cloth, canvas, or any material capable of supporting a weight, such as body weight. One advantage of using nylon is that it is a synthetic material having the desirable properties of great strength and elasticity, and is inexpensive to produce. Thus, a seat for a multiplicity of purposes may be provided.

Figure 3:
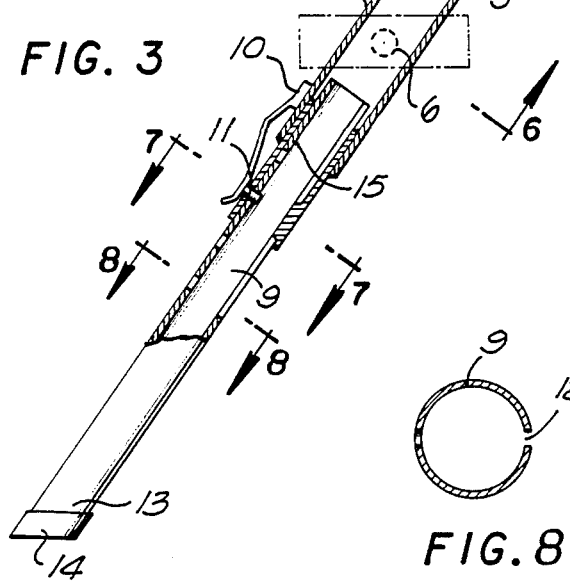
FIG. 3 is a longitudinal cross section view of a telescoping leg.

The seat is mounted to a plurality of telescoping legs. Referring now to FIG. 3, the legs may be fixed to the seat corner by use of cylindrical nylon or plastic caps 2. The caps 2 may be integrally molded with the seat 1 or, in the alternative, may be fabricated to fit within the inside top of the legs 3. Additionally, the seat 1 may be fused or glued at the seat corners to the tops of the legs, as shown in FIG. 3.

Still referring to FIG. 3, the telescoping legs 3 of the present invention are described. The legs are comprised of three sections, upper 7, central 8, and lower 9. In the preferred embodiment of the present invention, the leg sections are comprised of aluminium, due to its superior weight/strength characteristics, ease of fabrication and formation of the final product, and high resistance to atmospheric corrosion. Aluminium requires no protective coating to prevent corrosion, thereby providing a long lasting stool especially suited for outdoor use.

The central telescoping leg section 8 has a unique "dual diameter" construction. A small diameter region communicates with the lower telescoping leg section 9, and a large diameter region communicates with the upper leg section 7. The central leg section 8 is cast as a single piece in the preferred embodiment, thereby eliminating the necessity for weld connections between leg portions, which can reduce the strength of the legs, and increase the potential of fatigue and stress concentrations.

The top and bottom leg sections are of different diameters for communication with the two diameters of the central leg section. When the top and bottom leg sections are pushed into the central section for storage, the smaller lower section nests within the larger top section. In this manner, a greater reduction in size may be achieved. Although the top leg section is of a larger diameter than the lower leg section in the preferred embodiment, the lower section may be of a larger diameter if desired.

Each of the top and bottom leg sections include a plurality of openings formed therein so that the length of the leg assembly may be selectably controlled. The central section has first and second spring clips 10 mounted at the upper and lower ends respectively. The spring clips 10 include extensions or pins 11 for engaging the openings of the upper and lower leg sections and holding them in place. The spring clips are biased so as to urge the extensions into the openings and thereby prevent movement of the upper and lower sections with respect to the central section when in use. The central section also includes openings formed therein for accepting the extensions 11 of the spring clips. As shown in FIG. 3, the spring clip extensions extend through both the opening in the central section and an opening in the upper or lower sections.

Figure 4:
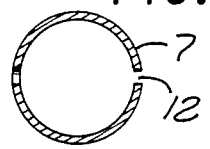
FIG. 4 is a cross sectional view of the upper leg section across line 4—4 in FIG. 3.
Figure 8:
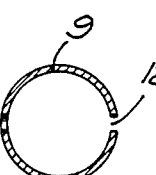
FIG. 8 is a cross sectional view of the lower telescoping leg section across line 8—8 in FIG. 3.

The upper and lower sections are keyed to the central section to register the plurality of openings with the spring clip extensions. Thus, there is no need to rotate the sections with respect to each other to search for the openings before operation. As seen in FIG. 4 and 8, the upper and lower sections include slots 12 formed along the length thereof. These slots 12 only extend partially along the length of the sections so as to maximize strength. The inner diameter of the central section includes a ridge for engaging the slots of the upper and lower sections. The upper and lower sections cannot be inserted into the central section unless the slots are registered with the ridge of the central section.

Figure 2:
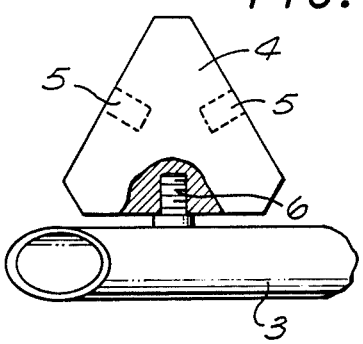
FIG. 2 is a perspective view of the central pivot joint with one leg in cross section.

The three leg assemblies are joined together with a central pivot joint to stabilize the leg assemblies and prevent their movement with respect to each other. Referring to FIG. 2, the central pivot joint 4 is a triangular nut having tapped holes formed therein. The central leg sections each have threaded extended member 6 for engagement with the tapped openings 5 of the pivot joint 4. By utilizing a tapped hole and threaded members, the leg assemblies can rotate with respect to the pivot joint, allowing the leg assemblies to be "folded up" so that all three leg assemblies are parallel for storage.

Figure 5:
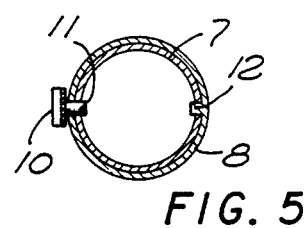
FIG. 5 is a cross sectional view of the central telescoping leg section encircling the upper telescoping leg section, across line 5—5 in FIG. 3.
Figure 6:
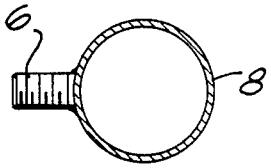
FIG. 6 is a cross sectional view of the central telescoping leg section, across line 6—6 in FIG. 3.
Figure 7:
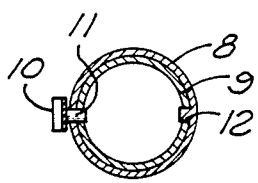
FIG. 7 is a cross sectional view of the central telescoping leg section encircling the lower telescoping leg section, across line 7—7 in FIG. 3.

FIG. 4–8 depict cross sectional views of the three leg sections both individually and in conjunction with other leg sections. As shown in FIG. 4 and 5, the upper leg section 7 has leg hole 12 for engagement with pin 11, and is encircled by the central leg section 8 at the lowermost portion. FIG. 6 depicts the central leg section with the screw threaded member 6 for engagement with the central pivot joint. Further, as shown in FIGS. 7 and 8, the lower leg section 9 also has leg hole 12 for similar engagement with pin 11, and is encircled by the central leg section 8 at the uppermost portion.

FIG. 9 depicts an alternative embodiment of the present invention. In FIG. 9, the "keying" of the upper and lower leg sections to the central leg section is eliminated by virtue of cross sectional modifications. In this configuration, the leg sections are provided with triangular cross sections, such that the upper, central and lower leg sections are necessarily aligned with respect to one another. It will be obvious to one skilled in the art that a plurality of cross sections may be provided, such as semicircular, and square. The upper and lower leg sections may still be slidably disposed within the central leg section, however the slot 12 and ridge 15 elements are necessarily absent. In this alternate embodiment, a nonequilateral triangular cross section is provided so that telescoping of the leg section may only be accomplished with a single orientation of the sections with respect to each other.

FIG. 10 describes yet another embodiment of the present invention. As shown in FIG. 10, the upper and lower leg sections are provided with the same triangular cross sections described with regard to FIG. 9. Yet in this embodiment the central leg section is designed with a circular cross section throughout the shaft, and with triangular ends. In this manner, the upper and lower leg sections may align with the ends of the central leg section, as discussed above. Such reference to a triangular cross section is only for purposes of example. Of course, semi-circular, square, rectangular and other configurations which result in a single orientation of the leg sections may also be provided.

Ground surface contact of the telescoping legs is maximized by forming the foot of the lower leg section 13 at an angle. This unique feature maximizes the surface area of contact of the foot with the ground and thereby reduces the chance of movement of the legs with respect to the ground. The angled foot 13 has a lower leg cap 14 for protection from scraping, wear, and corrosion, and additionally for aesthetic pleasure.

The telescoping tripod stool of the above-described embodiments overcomes the stability problems of the prior art stools by virtue of the central pivot joint and associated screw threaded members for attaching the legs to the joint. Additionally, spring-snap devices and pins lock the telescoping legs in place after adjustment for particular leg height. The lower leg sections are angled to maximize ground surface contact. Unintended collapse of the stool is prevented by designing the central leg section with two different diameters yet cast as a single piece, thereby eliminating fatigue and stress concentrations of welded surface.

Referring now to FIGS. 11-18, yet another embodiment of the present invention will be described. As best seen in FIG. 11, a triangular seat 20 is suspended from leg assemblies 22 by brackets 26 which will be more fully described below. The three leg assemblies 22 are joined to a central pivot joint 24 at the approximate centers of each leg. As in previously described embodiments, a triangular configuration is preferred since it affords inherent stability when the stool is its fully erected configuration as shown in FIG. 11 and yet has minimal volume and weight when collapsed into a compact bundled configuration for storage or carrying as shown in FIG. 17. This embodiment offers particular advantages in terms of ease of manufacture and cost.

Referring now to FIGS. 12 and 13, the details of leg assemblies 22 will be described. Each of leg assemblies 22 comprises an upper section 22a and a lower section 22b. The leg assemblies are tubular, preferably with a circular cross section, although other cross sections may be employed as previously discussed. A short length of tubing 28 is secured to lower leg section 22b at the upper end thereof. Tube section 28 projects out of the upper end of lower leg section 22b such that it may be inserted within the lower end of upper leg section 22a. The outer diameter of tube section 28 is slightly smaller than the inner diameter of leg section 22a such that it may be inserted therein easily without binding. Tube section 28 is secured to lower leg section 22b by an adhesive or other suitable means, such as welding or mechanical fasteners. Alternatively, the projecting portion of tube section 28 may be fashioned as an integral part of lower leg section 22b, however, this is less desirable due to the added costs of machining the lower leg sections.

The upper end of upper leg section 22a is preferably cut at an angle to receive bracket 26 as shown in FIG. 12. Bracket 26 includes a cylindrical portion 30 which fits snugly within tubular leg section 22a. Bracket 26 is preferably made of a plastic material such that it may be press fitted within leg section 22a and be securely retained therein without need for an adhesive or other fastening means. Of course, bracket 26 may be more permanently secured to leg section 22a if desired. In like fashion, foot 32 is secured to the lower end of lower leg section 22b. Foot 32 includes cylindrical portion 34 which fits snugly within tubular section 22b.

Leg sections 22a and 22b are retained in a coupled configuration by cord 36. Cord 36 is preferably made of an elastic cord material of the type commonly known as "bungee" cord. Bracket 26 includes a tab member 38 through which cord 36 is passed and secured by means of ferrule 42. Likewise, foot 32 includes tab 40 through which the other end of cord 36 is passed and secured in a similar manner. Cord 36 is of a length such that it is under slight tension when leg sections 22a and 22b are joined as shown in FIG. 12. However, the tension is not so great such that undue force is required to separate leg sections 22a and 22b from one another in the manner illustrated in FIG. 13. Leg sections 22a and 22b are preferably approximately equal in length so that leg section 22 can be collapsed to approximately half of its fully erect length. As shown in FIG. 13, lower leg section 22b may be withdrawn axially from upper leg section 22a and then the two sections may be folded together in a compact collapsed configuration.

As in the previously described embodiments, leg sections 22a and 22b are preferably constructed of aluminum. However, other metals, plastics or composites having comparable weight/strength characteristics may be employed as a matter of design choice. Although two leg sections 22a and 22b have been described, a greater number of leg sections may be employed if desired, either to permit a correspondingly higher seat level or to reduce the length of the legs in their fully collapsed configuration.

Bracket 26 includes slot 44 which is used to secure seat 20. Triangular seat 20 includes a tab of material 46 at each corner thereof. Tab 46 is passed through slot 44 of bracket 26 and secured to the material of seat 20 by suitable means, such as stitching 48. Alternatively, tab 46 may be secured with a snap type or other detachable fastener to facilitate the removal of seat 20 from leg assemblies 22, if desired.

As previously discussed in connection with the other embodiments, seat 20 may be constructed of nylon, canvas or any other suitable fabric material capable of supporting the weight of a person. While a commonly available fabric material may be employed, it is preferred that seat 20 be made of a material having a triaxial weave, wherein the fibers of the fabric are oriented at 60° intervals. Such a material offers the advantage of uniform tension between each of the leg attachments when under load. Consequently, leg assemblies 22 maintain an equiangular orientation as seat 20 is loaded. With a conventionally woven fabric material, it is not possible to achieve uniform tension between the legs. As a result, there is a greater tendency for the legs to assume a non-equiangular orientation which, in extreme cases, may result in unintended collapse of the stool as it is loaded.

Figure 19:
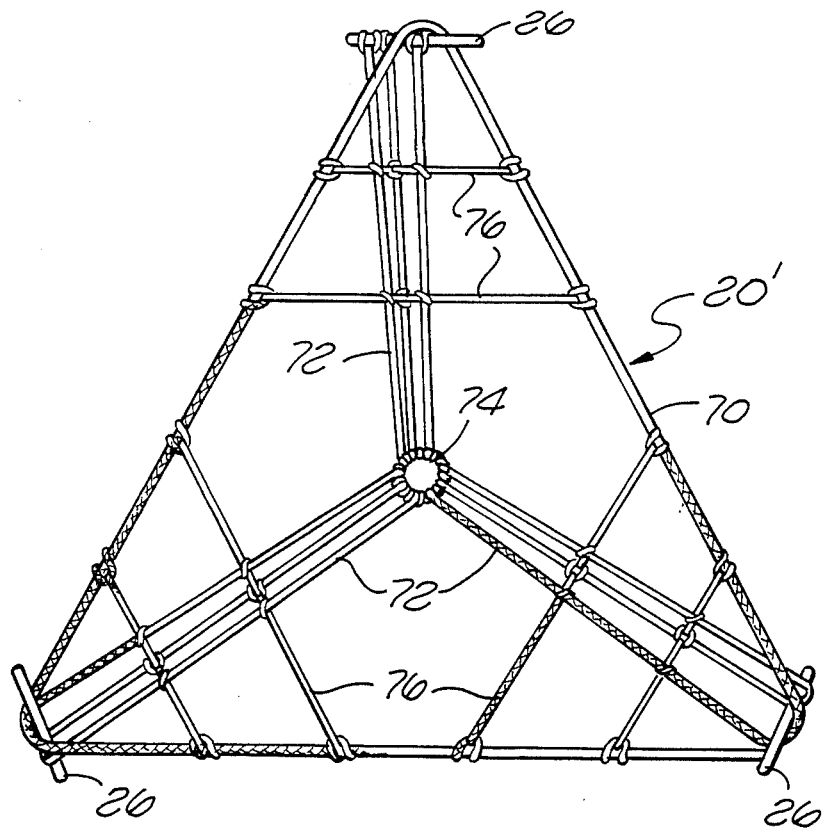
FIG. 19 is a top plan view of an alternate style of seat.

As an alternative to making seat 20 of a closely woven fabric with a triaxial weave, an open mesh construction having triaxial symmetry may be employed as illustrated in FIG. 19. Seat 20' is woven of a high-strength cord in macrame fashion and is secured to bracket 26 at each leg assembly. In one configuration, seat 20' comprises a perimeter cord 70, a plurality of radial cords 72 secured to a central ring 74, and a plurality of spaced apart cords 76 joining cords 70 and 72. It will be apparent that many other specific weaving patterns may be employed to construct seat 20' and that such patterns may be varied to provide an aesthetically pleasing appearance in addition to structural integrity. A seat 20' of macrame construction is not, of course, limited to the embodiment of FIG. 11, but may be employed with the embodiment of FIG. 1 as well.

Referring now to FIG. 14, details of central pivot joint 24 are illustrated. A short length of fabric such as nylon strapping material 50 is secured around each of upper leg sections 22a adjacent to the lower end thereof. Strapping 50 is secured to leg sections 22a by an adhesive or by other suitable means such as mechanical fasteners. The free ends of each of straps 50 are centrally joined by the assembly comprising bolt 52, washers 54 and nut 56. Other types of fasteners, such as a grommet or a rivet may be used to join straps 50, or they may be joined by means such as stitching. The material of which straps 50 are made is sufficiently flexible so that leg assemblies 22 may pivot freely about one another but is sufficiently strong to maintain the integrity of joint 24 when the stool is fully loaded.

It is to be noted that this construction of central pivot joint 24 allows each of leg assemblies 22 to pivot slightly about its longitudinal axis due to the inherent flexibility of straps 50. This additional degree of freedom is particularly advantageous when placing the stool on uneven terrain since it allows the legs to assume relative orientations to more evenly distribute the loading of seat 20. Furthermore, such axial rotation of leg assemblies 22 assist in collapsing the stool to a compact configuration for storage or carrying.

A carrying strap 58 is preferably secured to central pivot joint 24 as shown in FIG. 15. Carrying strap 58 provides a convenient means for carrying the stool when it is in its fully collapsed configuration as shown in FIG. 17. In addition, an elastic strap 60 is preferably secured to one side edge of seat 20 as shown in FIG. 16. Elastic strap 60 provides a convenient means for securing the collapsed leg assemblies 22 of the stool in a compact bundle as shown in FIG. 17.

As shown in FIG. 12, foot 32 may be a simple end plug for lower leg section 22b. Alternatively, a pivoting foot assembly may be employed as shown in FIG. 18. A foot pad 62 is privotally disposed within socket 64 which fits within the end of lower leg section 22b in a manner similar to foot 32. A pivoting foot assembly such as shown in FIG. 18 offers somewhat greater stability, especially when the stool is used on uneven terrain.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims

I claim:

1. A collapsible tripod stool comprising:
    a seat;
    a plurality of tubular leg assemblies, each of said leg assemblies having at least an upper and a lower leg section, said leg sections including coupling means for coupling said leg sections together in axial alignment, each of said leg assemblies further having leg tensioning means for urging said leg sections together in a coupled relationship; and
    a central pivot joint joining said plurality of tubular leg assemblies to one another and permitting simultaneous rotation of each leg assembly about the pivot joint and rotation of each leg assembly about its respective axis.

2. The tripod stool of claim 1 having a triangular seat and three of said tubular leg assemblies.

3. The tripod stool of claim 1 wherein said coupling means comprises a telescoping tubular member secured within one of said leg sections and extending out of one end thereof, said tubular member insertable into an end of another of said leg sections.

4. The tripod stool of claim 1 wherein said leg tensioning means comprises an elastic cord secured at one end thereof to one of said leg sections and at an opposite end thereof to another of said leg sections.

5. The tripod stool of claim 1 wherein said central pivot joint comprises a plurality of fabric straps, each of said fabric straps secured to a respective one of said leg assemblies and having at least one end joined to corresponding ends of the other of said fabric straps.

6. The tripod stool of claim 1 further comprising a carrying strap coupled to said central pivot joint.

7. The tripod stool of claim 1 further comprising strap means coupled to said seat for securing said leg assemblies in a bundle when in a collapsed configuration.

8. The tripod stool of claim 2 wherein said seat is constructed of a fabric having a triaxial weave.

9. The tripod stool of claim 2 wherein said seat is constructed of woven cord so as to have triaxial symmetry.

10. A collapsible tripod stool comprising:
    a triangular seat;
    three tubular leg assemblies, each having an upper leg section and a lower leg section, each of said upper and lower leg sections having respective upper and lower ends, said lower leg sections having a telescoping tubular member extending from said upper end thereof for insertion into said lower end of said upper leg section so as to couple said upper and lower leg sections together in axial alignment;
    a seat suspension bracket attached to said upper end of each of said upper leg sections, said bracket having a slot for receiving a corner of said triangular seat;
    a foot attached to said lower end of each of said lower leg sections;
    an elastic cord secured at one end thereof to said seat bracket and at an opposite end to said foot, said elastic cord extending through said upper and lower leg sections so as to urge said leg sections together in a coupled relationship; an
    a central pivot joint comprising three fabric straps, one secured to each of said upper leg sections adjacent to said lower end thereof and having at least one end joined to corresponding ends of the other two of said three fabric straps.

11. The tripod stool of claim 10 further comprising a carrying strap coupled to said central pivot joint.

12. The tripod stool of claim 10 further comprising strap means coupled to said seat for securing said leg assemblies in a bundle when in a collapsed configuration.

13. The tripod stool of claim 10, wherein said sea is constructed of a fabric having a triaxial weave.

14. The tripod stool of claim 10 wherein said seat is constructed of woven cord so as to have triaxial symmetry.

* * * * *